US008616456B2

(12) United States Patent
Kargl et al.

(10) Patent No.: US 8,616,456 B2
(45) Date of Patent: Dec. 31, 2013

(54) PASSIVE RFID TRANSPONDER AND RFID READER

(75) Inventors: Walter Kargl, Graz (AT); Edmund Ehrlich, Grambach (AT)

(73) Assignee: Infineon Technologies AG, Neubiberg (DE)

(*) Notice: Subject to any disclaimer, the term of this patent is extended or adjusted under 35 U.S.C. 154(b) by 108 days.

(21) Appl. No.: 13/040,421

(22) Filed: Mar. 4, 2011

(65) Prior Publication Data

US 2011/0215158 A1    Sep. 8, 2011

(30) Foreign Application Priority Data

Mar. 4, 2010   (DE) .......................... 10 2010 002 584

(51) Int. Cl.
*G06K 19/06*   (2006.01)
(52) U.S. Cl.
USPC ........................................ 235/492; 235/487
(58) Field of Classification Search
USPC ................................................ 235/487–492
See application file for complete search history.

(56) References Cited

U.S. PATENT DOCUMENTS 6,965,816 B2 * 11/2005 Walker ............................ 701/16
7,388,497 B1 * 6/2008 Corbett et al. ............. 340/572.4
7,633,377 B2 * 12/2009 Sadr ............................. 340/10.1
2004/0179547 A1   9/2004 Kuffner et al.
2008/0030307 A1   2/2008 Chen
2008/0143488 A1   6/2008 Yamamoto et al.
2008/0197982 A1   8/2008 Sadr

FOREIGN PATENT DOCUMENTS

WO    2007039835 A2    4/2007

OTHER PUBLICATIONS

Office Action issued Oct. 11, 2010 in re Application No. DE102010002584.4-31.

* cited by examiner

*Primary Examiner* — Daniel St. Cyr
(74) *Attorney, Agent, or Firm* — Murphy, Bilak & Homiller, PLLC (57) ABSTRACT

A passive RFID transponder includes a coder and a modulator. The coder generates a digital coded data stream based on a digital data stream to be transmitted. The digital coded data stream includes an initialization bit sequence having a maximum data frequency of the digital coded data stream. Furthermore, the digital coded data stream changes its value at the latest after a predefined number of bits. The modulator modulates an amplitude of a carrier signal with the digital coded data stream to provide an amplitude-modulated coded signal.

19 Claims, 9 Drawing Sheets

PASSIVE RFID TRANSPONDER AND RFID READER

PRIORITY CLAIM

This application claims priority to German patent application 10 2010 002 584.4 filed on 3 Apr. 2010, the content of said application incorporated herein by reference in its entirety.

TECHNICAL FIELD

The present application relates to RFID communication systems and, in particular, to a passive RFID transponder, an RFID reader, a method for providing an amplitude-modulated coded signal and a method for providing a decoded digital data stream.

BACKGROUND

RFID (radio frequency identification) communication systems are used in many fields, for example security applications, access controls, payment systems, tagging and tracking items, etc. In this case, passive RFID transponders are integrated into chip cards or tags, for example, and are read or written to with the aid of an RFID reader. In this case, the RFID reader uses inductive coupling to provide the energy needed by the passive RFID transponder to process and transmit data. As a result of the weak coupling between the transponder antenna and the antenna of the reader, the signal to be detected on the reader side is considerably smaller than the carrier signal. The ratio of carrier signal to received signal is in the region of 80 dB, for example, which constitutes a great challenge for the reader.

On the side of the passive RFID transponder, the challenge is to transmit data with as little hardware complexity and energy consumption as possible and nevertheless to achieve data rates which are as high as possible.

SUMMARY

According to an embodiment, a passive RFID transponder includes a coder and a modulator. The coder is configured to generate a digital coded data stream on the basis of a digital data stream to be transmitted. In this case, the digital coded data stream includes an initialization bit sequence. The initialization bit sequence has a maximum data frequency of the digital coded data stream. Furthermore, the digital coded data stream changes its value at the latest after a defined number of bits. The modulator is configured to modulate an amplitude of a carrier signal with the digital coded data stream to provide an amplitude-modulated coded signal.

Exemplary embodiments are based on the core idea of a passive RFID transponder coding data to be transmitted and modulating the carrier signal directly with the digital coded data stream. Two-stage modulation using a subcarrier signal is not required for this purpose. As a result, the effort needed to modulate the carrier signal is reduced considerably and the maximum achievable data rate of the transmission data is not limited by a frequency of a subcarrier signal. An RFID reader which receives data from the RFID transponder can determine the data rate of the received data by evaluating the initialization bit sequence since the maximum data frequency, that is to say a direct sequence of 0, 1, 0, 1, 0, 1 . . . , occurs in the initialization bit sequence. In addition, stable synchronization with the received data stream can be ensured since the coded data stream changes its value at the latest after a predefined number of bits.

Some exemplary embodiments relate to an RFID reader including a receiver, a demodulator and a decoder. The receiver is configured to receive an amplitude-modulated coded reception signal. Furthermore, the demodulator is configured to demodulate the amplitude-modulated coded reception signal on the basis of a carrier signal generated by the RFID reader in order to obtain a digital coded data stream. Furthermore, the decoder is configured to determine a maximum data frequency of the digital coded data stream and to provide a coded digital data stream on the basis of the maximum data frequency determined. The RFID reader can reconstruct the received data even though the coded data stream is modulated directly onto the carrier signal since the reader can determine a maximum data frequency and the data rate of the received data is therefore known.

Passive RFID transponders according to the embodiments described herein can be used, for example, in chip cards, ID cards or tags. In this case, the RFID transponder should be understood as meaning, for example, the integrated circuit without an antenna, as can be produced on a silicon substrate using conventional semiconductor production methods, for example. The associated antenna can then be implemented, for example, in the card body of a chip card, in the ID card or in a tag in which an RFID transponder is integrated. However, the antenna may equally also be integrated directly on the RFID transponder chip.

Some exemplary embodiments relate to a passive RFID transponder having a coder and a modulator. The coder generates a digital coded data stream on the basis of a digital data stream to be transmitted. The digital coded data stream includes an initialization bit sequence. The initialization bit sequence has a maximum data frequency of the digital coded data stream, the maximum data frequency being independent of a subcarrier signal. Furthermore, the modulator modulates an amplitude of a carrier signal with the digital coded data stream in order to provide an amplitude-modulated coded signal.

As a result of the direct modulation of the carrier signal with the digital coded data stream independently of a subcarrier signal, the hardware complexity for the RFID transponder can be considerably reduced since two-stage modulation is not required. In addition, the data rate can be increased since there is no restriction by a subcarrier signal. An RFID reader can detect the maximum data frequency and thus also the data rate of the data to be transmitted on the basis of the initialization bit sequence and can thus reconstruct the transmitted data.

Some other exemplary embodiments relate to a passive RFID transponder having a coder and a modulator. The coder generates a digital coded data stream on the basis of a digital data stream to be transmitted, with the result that the digital coded data stream changes its value at the latest after a predefined number of bits. Furthermore, the digital coded data stream has a maximum data frequency which is independent of a subcarrier signal. Furthermore, the modulator modulates an amplitude of a carrier signal with the digital coded data stream in order to provide an amplitude-modulated coded signal.

As a result of the direct modulation of the carrier signal with the digital coded data stream, the hardware complexity for the RFID transponder can be considerably reduced since two-stage modulation is not required. In addition, the maximum data frequency of the data to be transmitted can be increased since the data rate is independent of a subcarrier signal. As a result of the fact that the digital data stream to be transmitted is coded such that the digital coded data stream changes its value at the latest after a predefined number of bits, permanent synchronization with the received signal can be made easier for an RFID reader.

Some exemplary embodiments relate to a chip card having an RFID transponder according to the described concept.

Some exemplary embodiments relate to an RFID communication system having a passive RFID transponder and an RFID reader. In this case, an amplitude-modulated coded signal from the passive RFID transponder is provided to the RFID reader as an amplitude-modulated coded reception signal, that is to say is transmitted from the RFID transponder to the RFID reader.

Some exemplary embodiments relate to a method for providing an amplitude-modulated coded signal. The method includes generating a digital coded data stream based on a digital data stream to be transmitted. In this case, the digital coded data stream includes an initialization bit sequence. The initialization bit sequence has a maximum data frequency of the digital coded data stream. In this case, the maximum data frequency is independent of a subcarrier signal. Furthermore, the method includes modulating an amplitude of a carrier signal with the digital coded data stream in order to provide the amplitude-modulated coded signal.

Other exemplary embodiments relate to a method for providing an amplitude-modulated coded signal. The method includes generating a digital coded data stream based on a digital data stream to be transmitted. The digital coded data stream is generated such that the digital coded data stream changes its value at the latest after a predefined number of bits. In this case, a maximum data frequency of the digital coded data stream is independent of a subcarrier signal. Furthermore, the method includes modulating an amplitude of a carrier signal with the digital coded data stream in order to provide the amplitude-modulated coded signal.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
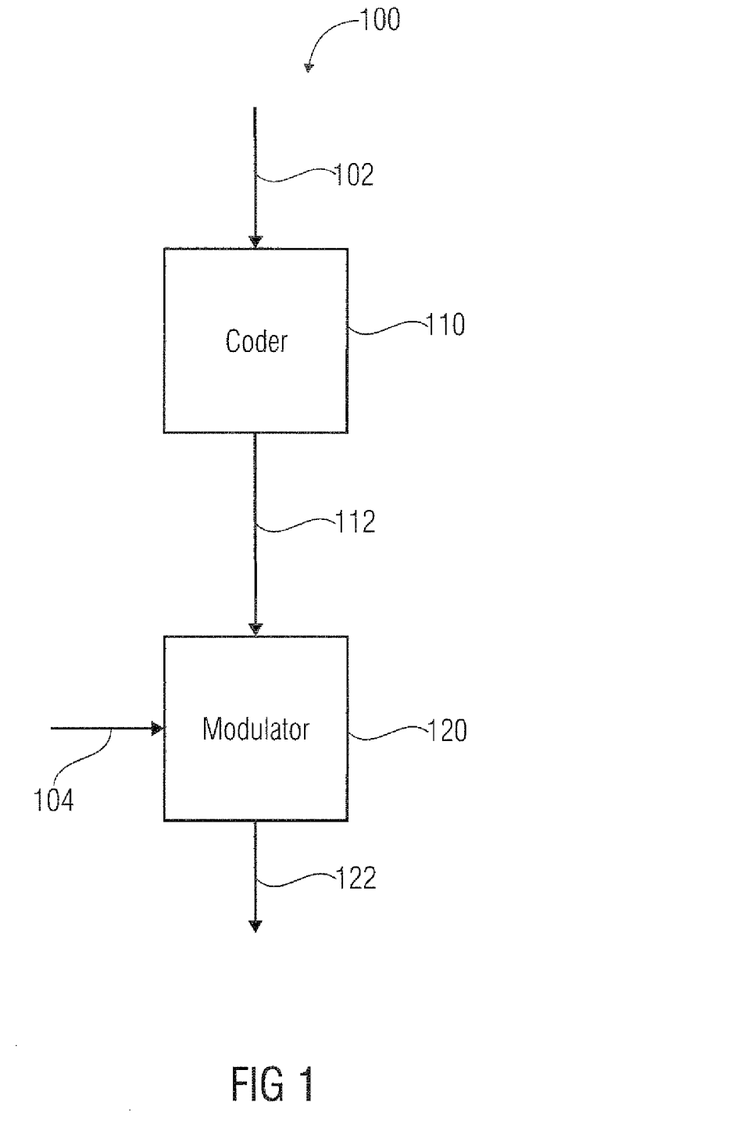
FIG. 1 shows a block diagram of a passive RFID transponder.

FIG. 1 shows a block diagram of a passive RFID transponder 100 in accordance with an exemplary embodiment. The passive RFID transponder 100 includes a coder 110 connected to a modulator 120. The coder 110 generates a digital coded data stream 112 based on a digital data stream 102 to be transmitted. In this case, the digital coded data stream 112 includes an initialization bit sequence. The initialization bit sequence has a maximum data frequency of the digital coded data stream 112. In addition, the digital coded data stream 112 changes its value at the latest after a predefined number of bits. The modulator 120 modulates an amplitude of a carrier signal 104 with the digital coded data stream 112 in order to provide an amplitude-modulated coded signal 122.

As a result of the direct modulation of the carrier signal 104 with the digital coded data stream, the hardware complexity and/or the energy consumption for transmitting data can be considerably reduced in comparison with concepts which use, for example, two-stage modulation with the aid of a subcarrier signal. For example, the energy consumption can be reduced with the same data rate as a result of the simpler modulation and the associated hardware complexity. In addition, the data rate and thus the maximum data frequency of the data stream to be transmitted can be increased since the data rate is independent of a frequency of a subcarrier signal. Instead, only the frequency of the carrier signal is an upper limit for the data rate. With the same energy consumption or even with a lower energy consumption and in conjunction with the low level of hardware complexity, the data rate for transmitting data to an RFID reader can thus be considerably increased.

The maximum data frequency for a predefined data rate is shown by a directly successive alternating sequence of 0s and 1s (of high and low signal levels). In this case, the data frequency is called the maximum data frequency. With the same data rate, the bit string 00110011 has a lower data frequency than the maximum data frequency, for example. The data rate can therefore be directly inferred from the maximum data frequency. The initialization bit sequence thus has a direct sequence of alternating 0s and 1s, that is to say at least one bit sequence 0101 comprising 4 bits or a longer sequence of alternating 0s and 1s (for example 8 bits, 16 bits or more). This initialization bit sequence can then be detected by an RFID reader, for example, and the data rate of the transmitted signal can therefore be determined using the maximum data frequency.

The maximum data frequency and the data rate of a signal are specified, for example, in bits per second, kilobits per second or megabits per second.

In addition, the coder 110 codes the digital coded data stream such that the digital coded data stream 112 changes its value at the latest after a predefined number of bits. This makes it easier for an RFID reader to compensate for phase shifts and to retain permanent synchronization with the data stream. The predefined number of bits may be, for example, 4 bits, 5 bits, 8 bits, 16 bits or more bits. The smaller the predefined number of bits, the easier an RFID reader can retain synchronization, but this normally also requires more redundant data.

As a result, the error rate when reconstructing the transmitted digital data stream in an RFID reader can be considerably reduced.

Figure 2:
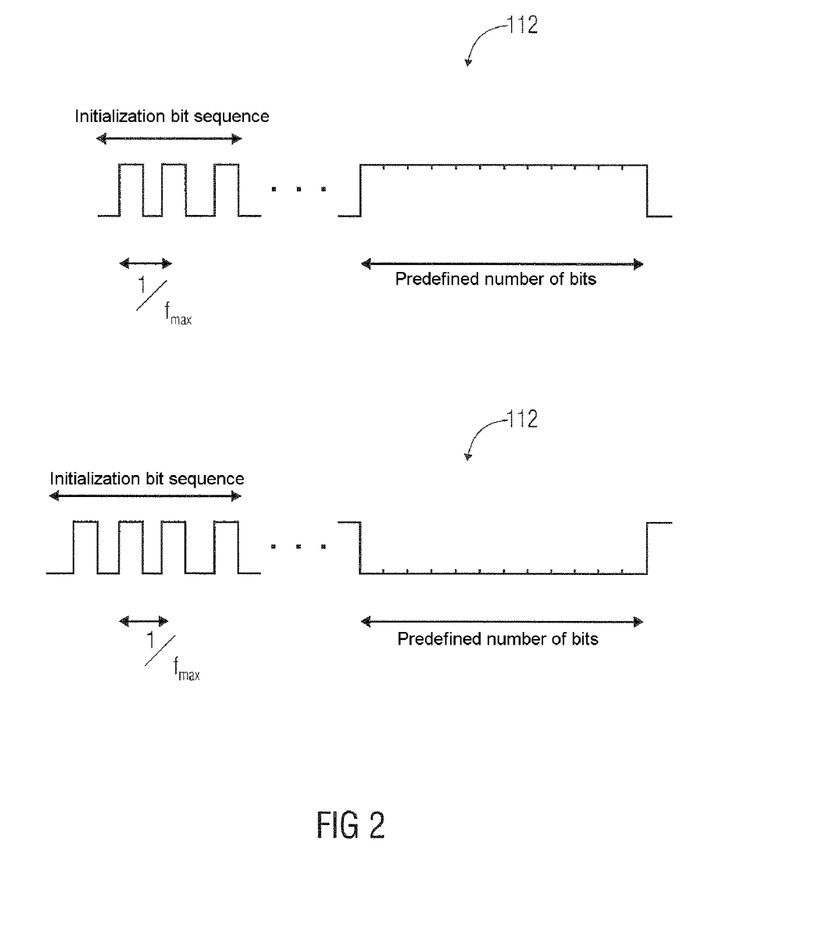
FIG. 2 shows a diagrammatic illustration of a digital coded data stream.

FIG. 2 shows two examples of a digital coded data stream 112. The two examples each show an initialization bit sequence and a change in the value of the digital coded data stream 112 after a predefined number of bits (12 bits in the example shown). The maximum data frequency $f_{max}$, which also corresponds to the data rate of the digital coded data stream, results from the duration of a 01 or 10 combination. The initialization bit sequence may have a plurality of successive 01 or 10 sequences (for example 4, 6, 8, 16 or even more 01 or 10 sequences) in order to simplify determination of the maximum data frequency for a reader.

The direct modulation of the carrier signal 104 makes it possible to select the maximum data frequency or the desired data rate independently of a subcarrier signal.

Figure 3:
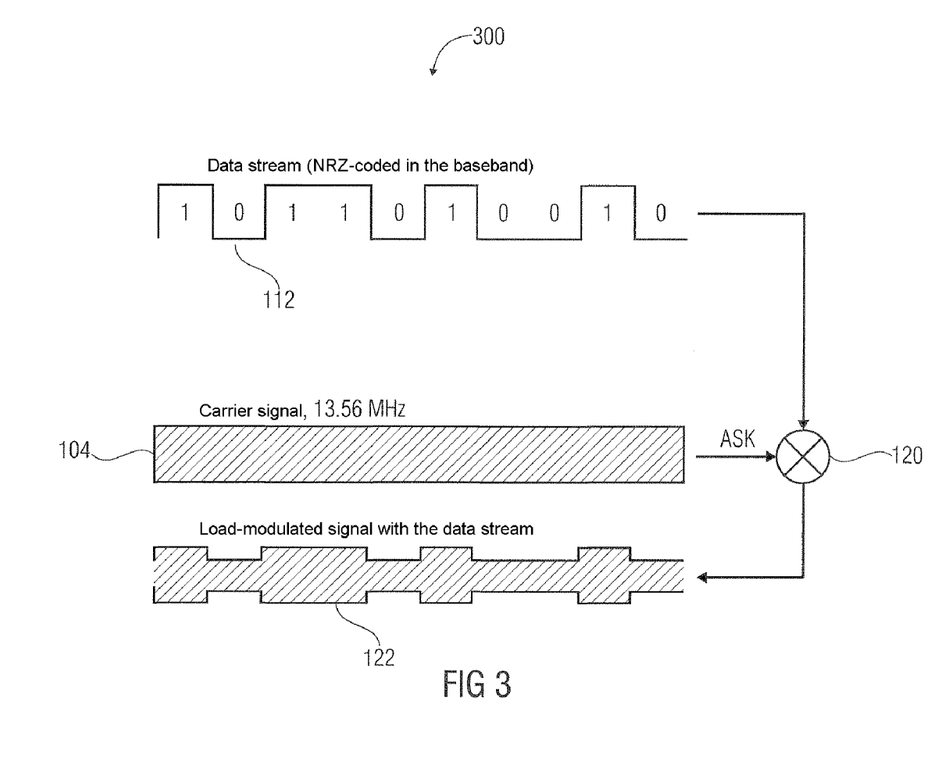
FIG. 3 shows a diagrammatic illustration of the direct modulation of a carrier signal by the digital coded data stream.

FIG. 3 shows a diagrammatic illustration of one example 300 of direct modulation of a carrier signal by the digital coded data stream 112. In this example, the coder 110 has generated the digital coded data stream 112 in the baseband on the basis of NRZ (non return to zero) coding. Alternatively, the coder can also use NRZI (non return to zero invert) coding or another coding algorithm which does not use a subcarrier signal. The carrier signal 104 (which, for example, has a frequency of 13.56 MHz which is typical of RFID applications) is subjected to direct amplitude modulation (ASK (amplitude shift keying) modulation) with the digital coded data stream 112 by the modulator 120. This type of modulation is also referred to as load modulation. The modulator 120 can then accordingly provide a load-modulated signal with the data stream 122 (amplitude-modulated coded signal).

The modulator 120 may have, for example, a transistor which changes the impedance of a resonant circuit of the RFID transponder on the basis of the digital coded data stream 112. For example, the transistor may connect a load to the resonant circuit or may disconnect a load from the resonant circuit. In this case, the transistor may be controlled at its control electrode by the digital coded data stream 112 in order to modulate the carrier signal directly with the digital coded data stream 112.

Coding of the digital data stream 102 to be transmitted, during which the digital coded data stream 112 changes its value at the latest after a predefined number of bits, can be achieved by the coder 110 in various ways.

Figure 4A:
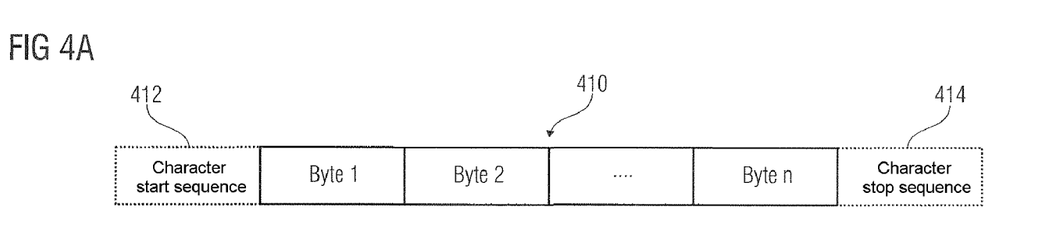
FIGS. 4a-4f show diagrammatic illustrations of data packets and digital coded data streams.
Figure 4B:
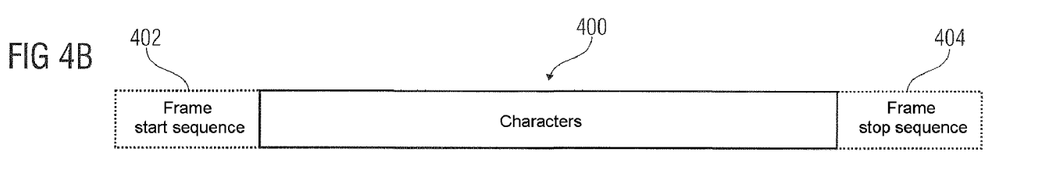

FIGS. 4a and 4b generally show one example of a possible structure of a data packet. In this case, FIG. 4b shows a frame 400 which can contain a plurality of characters 410, as are shown in FIG. 4a for example. The frame 400 has a frame start sequence 402 (frame start indication) at the beginning and a frame stop sequence 404 (frame stop indication) at the end. In this case, the frame start sequence 402 may contain the initialization bit sequence, for example. A character 410 includes a plurality of bytes as well as a character start sequence 412 (character start indication) and a character stop sequence 414 (character stop indication), as illustrated in FIG. 4a. The character start sequence 412 may also have the initialization bit sequence, but it may also be sufficient if the initialization bit sequence occurs only at one location (for example in the frame start sequence 402).

Figure 4C:
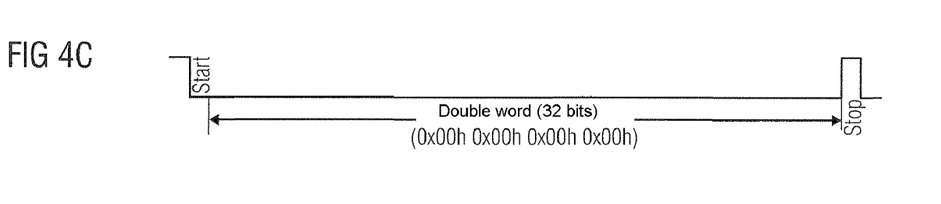
Figure 4D:
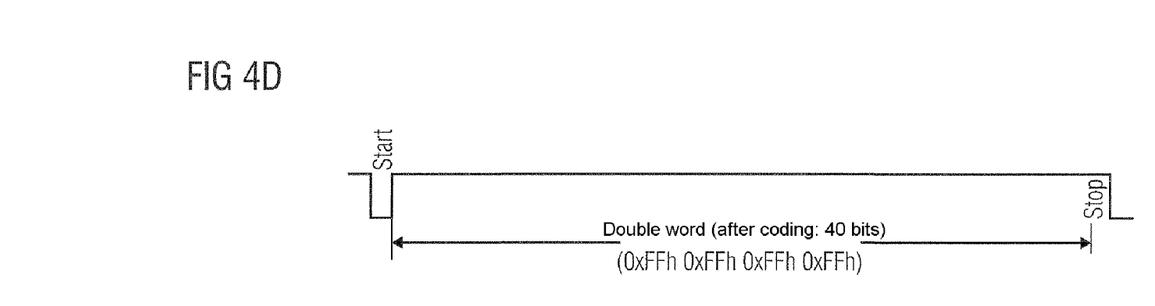

FIGS. 4c and 4d show possible contents of two double words, as may occur in the digital data stream 102 to be transmitted. In this case, the entire width of the double word shown in FIG. 4c is equal to 0 and the entire width of the double word shown in FIG. 4d is equal to 1. If such double words were transmitted directly, an RFID reader could possibly have problems with the permanent synchronization with the received signal. In order to avoid this, the coder 110 may use 4B5B coding, for example. During 4B5B coding, groups of 4 bits from the digital data stream 102 to be transmitted are mapped to groups of 5 bits. These groups of 5 bits may be predefined in a code table and may be selected in such a manner that at least one transition from 0 to 1 or from 1 to 0 is included in each group of 5 bits.

Figures 4E, 4F:
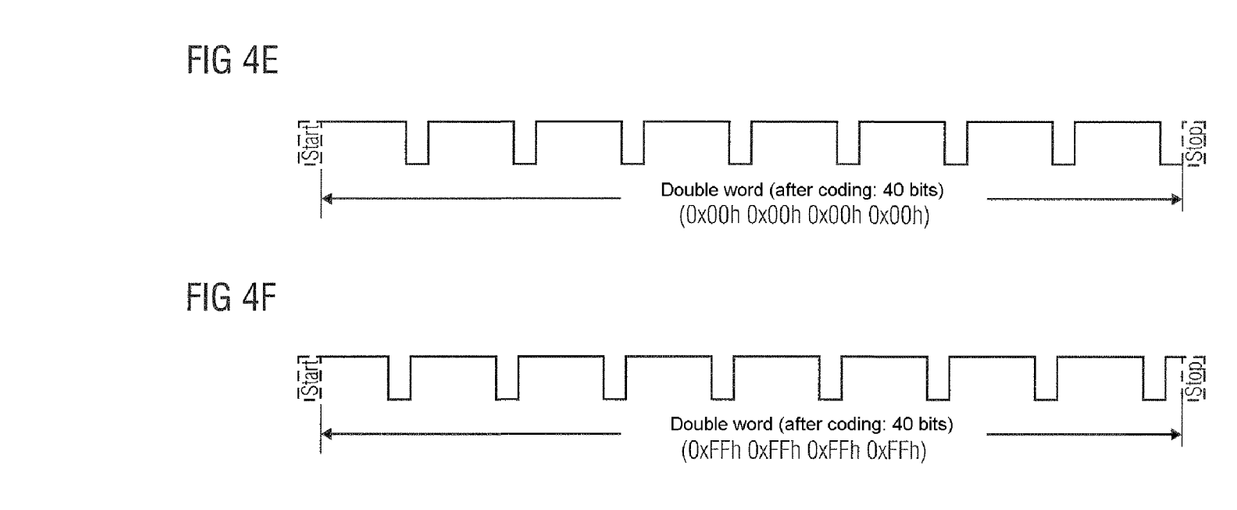

FIGS. 4e and 4f show the application of a 4B5B code to the double words illustrated in FIGS. 4c and 4d.

The coder 110 can assign a defined number of data bits from the digital data stream 102 to be transmitted to a respective coded bit sequence in order to obtain the digital coded data stream 112. In this case, a coded bit sequence includes more bits than the defined number of data bits from the digital data stream to be transmitted and not all bits in the coded bit sequence have the same value.

Alternatively, the coder 110 can expand the digital data stream 102 to be transmitted, for example, by adding data bits. This may be affected, for example, by virtue of the coder 110 adding at least one complementary bit to the digital data stream 102 to be transmitted if the digital data stream to be transmitted does not change its value over more bits than the predefined number of bits. For example, the coder 110 adds a 1 if the digital data stream to be transmitted has only 0s over the predefined number of bits or adds a 0 if the digital data stream 102 to be transmitted has only 1s over the predetermined number of bits.

Figure 5A:
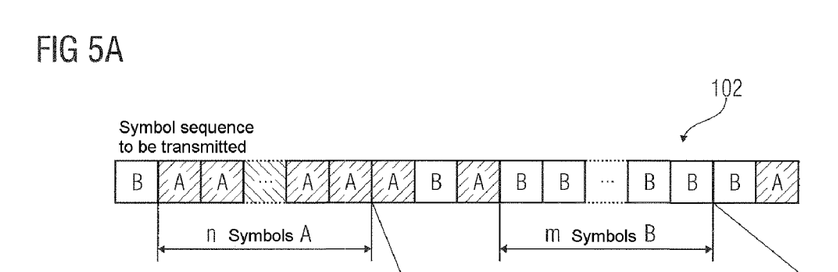
FIGS. 5a-5c show diagrammatic illustrations of digital coded data streams.
Figure 5B:
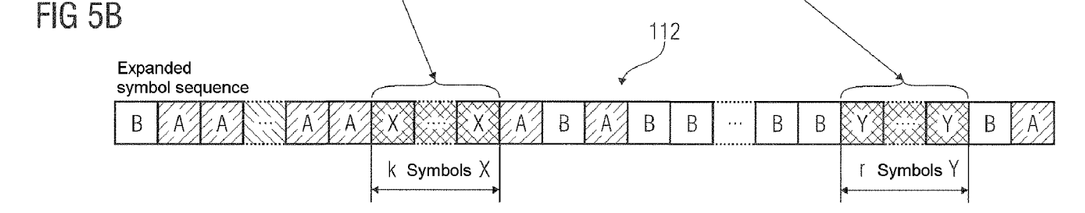
Figure 5C:
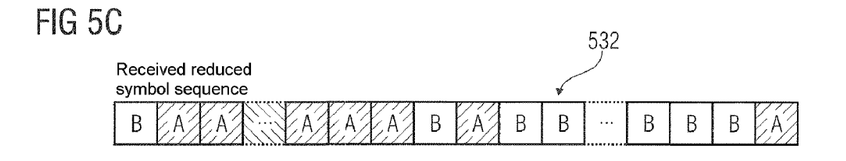

FIGS. 5a and 5b show a general example of the expansion of a digital data stream 102 to be transmitted by adding bits, and FIG. 5c shows an example of a digital data stream 532 which has been reduced again, as is generated in an RFID reader for example. FIG. 5a generally shows a symbol sequence which is to be transmitted and has two different types of symbols A and B (for example 0 and 1). If n symbols A (where n corresponds to the predefined number of bits for symbol A) now occur in succession in the symbol sequence to be transmitted, the coder can insert k symbols X, for example, where X=1 if A=0 and X=0 if A=1 in the specific example. Furthermore, the coder can insert r symbols Y if more than m symbols B (where m corresponds to the predefined number of bits for symbol B) occur in the symbol sequence to be transmitted, which, in the specific example, is the insertion of at least one 1 if B=0 and the insertion of at least one 0 if B=1. In the specific case, the symbols A, B, X and Y are each 0 or 1, where A=0 if B=1 or A=1 if B=0. X and Y therefore also always assume the complementary values of A and B, that is to say X=1 if A=0 and X=0 if A=1 and vice versa, Y=0 if B=1 and Y=1 if B=0. FIG. 5b shows one example of the expanded symbol sequence (corresponds to a digital coded data stream 112). In theory, different predefined numbers of bits (n not equal to m) can be defined for the symbols A and B. However, it is also sufficient for only one predefined number of bits to be defined for both symbols (n=m).

FIGS. 5a-5c show an example of symbol stuffing rules. Symbol stuffing can be used, for example, to indicate the limits of a frame, for example the start of a frame (SOF, start of frame) and/or the end of a frame (EOF, end of frame). In particular, however, it is possible to prevent long symbol sequences in which there is no change in the load modulation. That is to say, a change in the current load modulation state (a change in the value of the digital coded data stream) can be caused by symbol stuffing.

Alternatively, the coder 110 can also use a scrambling algorithm which scrambles bits from the digital data stream 102 to be transmitted such that the digital coded data stream 112 changes its value at the latest after a predefined number of bits.

The digital data stream 102 to be transmitted generally represents those data which the passive RFID transponder would like to send to an RFID reader as information. In contrast, the digital coded data stream 112 represents the digital data stream 102 to be transmitted after coding. In this case, the coder 110 can use, for example, an error correction code, an entropy code, a difference code, a bit stuffing code, a 4B5B code and/or a scrambling code in combination with NRZ coding or NRZI coding, for example.

The coder 110 and the modulator 120 may be independent hardware units or part of a computer or microcontroller as well as computer programs or software products for execution on a computer or microcontroller.

Figure 6:
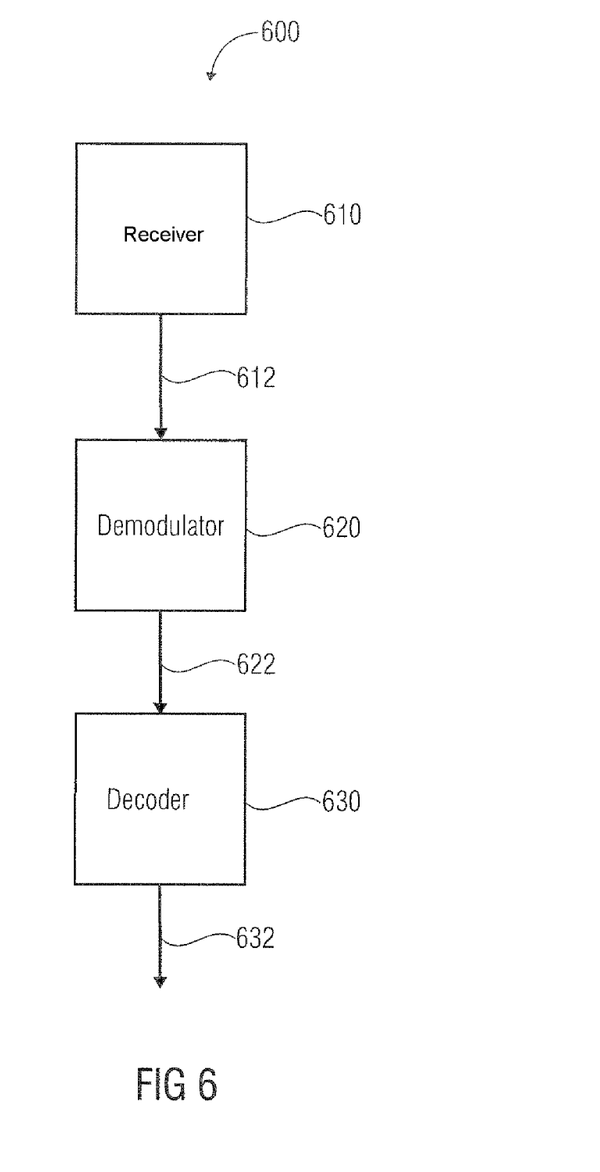
FIG. 6 shows a block diagram of an RFID reader.

FIG. 6 shows a block diagram of an RFID reader 600 in accordance with an exemplary embodiment. The RFID reader 600 includes a receiver 610, a demodulator 620 and a decoder 630. The receiver 610 is connected to the demodulator 620 and the demodulator 620 is connected to the decoder 630. The receiver 610 receives an amplitude-modulated coded reception signal 612 and the demodulator 620 demodulates the amplitude-modulated coded reception signal 612 on the basis of a carrier signal generated by the RFID reader 600 in order to obtain a digital coded data stream 622. Furthermore, the decoder 630 determines a maximum data frequency of the digital coded data stream 622 and provides a decoded digital data stream 632 based on the maximum data frequency determined.

The RFID reader 600 can determine the data rate of the digital coded data stream 622 by determining the maximum data frequency. If the data rate is known first, the digital coded data stream 622 can be decoded. For this purpose, the digital coded data stream 622 may include an initialization bit sequence, the initialization bit sequence having the maximum data frequency of the digital coded data stream 622.

The RFID reader 600 generates, for example, a carrier signal for transmitting data to an RFID transponder and for supplying the RFID transponder with energy. The RFID transponder can send data back to the RFID reader 600, for example by subjecting the carrier signal to load modulation. This load-modulated carrier signal then represents the amplitude-modulated coded reception signal 612. Therefore, the carrier signal generated by the RFID reader 600 can be used for demodulation. If the RFID transponder has transmitted the data to be transmitted by direct amplitude modulation of the carrier signal, the RFID reader 600 can also obtain the digital coded data stream 622 by direct demodulation of the amplitude-modulated coded reception signal 612 based on the carrier signal (for example with the carrier signal itself or on the basis of the frequency of the carrier signal). Therefore, there is no need for two-stage demodulation with the aid of a subcarrier signal, thus making it possible to reduce the hardware complexity of the RFID reader 600, for example.

In addition, the RFID reader 600 may have a synchronization apparatus. The synchronization apparatus may compensate for a phase shift in the digital coded data stream 622 on the basis of a change in the value of the digital coded data stream 622. In this manner, the synchronization apparatus can readjust synchronization in the event of a transition of the digital coded data stream 622 from 0 to 1 or from 1 to 0 and can thus compensate for a possible phase shift in the digital coded data stream 622 with respect to a reference clock or sampling clock of the demodulator 620 or of the decoder 630. The longer the digital coded data stream has a constant value, the higher the probability of a phase shift becoming so large that one bit in the digital coded data stream 622 is overlooked or added by the demodulator 620 or the decoder 630. In order to avoid this, the digital coded data stream 622 may be coded such that it changes its value at the latest after a predefined number of bits. This makes it possible to considerably reduce the error rate of the decoded digital data stream 632.

The demodulator 620 may have, for example, a differential amplifier in order to demodulate the amplitude-modulated coded reception signal 612. The differential amplifier may amplify a difference between the amplitude-modulated coded reception signal 612 and the carrier signal generated by the RFID reader 600. The demodulator 620 can then generate the digital coded data stream 622 based on the amplified difference.

This implementation makes it possible, for example, to manage even without a bandpass filter or with a low-quality bandpass filter for suppressing the carrier signal.

For this purpose, the RFID reader 600 may have, for example, a separate antenna for transmitting the carrier signal and a further antenna for receiving the amplitude-modulated coded reception signal 612. The carrier signal to be transmitted at the first antenna and the received amplitude-modulated coded reception signal 612 can then be passed to the differential inputs of the differential amplifier. The bit error rate of the decoded digital data stream 622 can be considerably reduced by a separate arrangement of a transmitting antenna and a receiving antenna using a differential amplifier for generating the digital coded data stream 622.

Since the RFID reader 600 can determine the maximum data frequency of a received digital coded data stream 622 via the decoder 630, the RFID reader 600 can process reception signals at different data rates. This makes it possible to process, for example, signals from different RFID transponders which use different data rates. In other words, the decoder 630 can process digital coded data streams 622 at different maximum data frequencies in order to generate decoded digital data streams 632.

The receiver 610, the demodulator 620 and the decoder 630 as well as the optional synchronization apparatus may be independent hardware units or part of a computer or microcontroller as well as a computer program or software product for execution on a computer or microcontroller.

Figure 7:
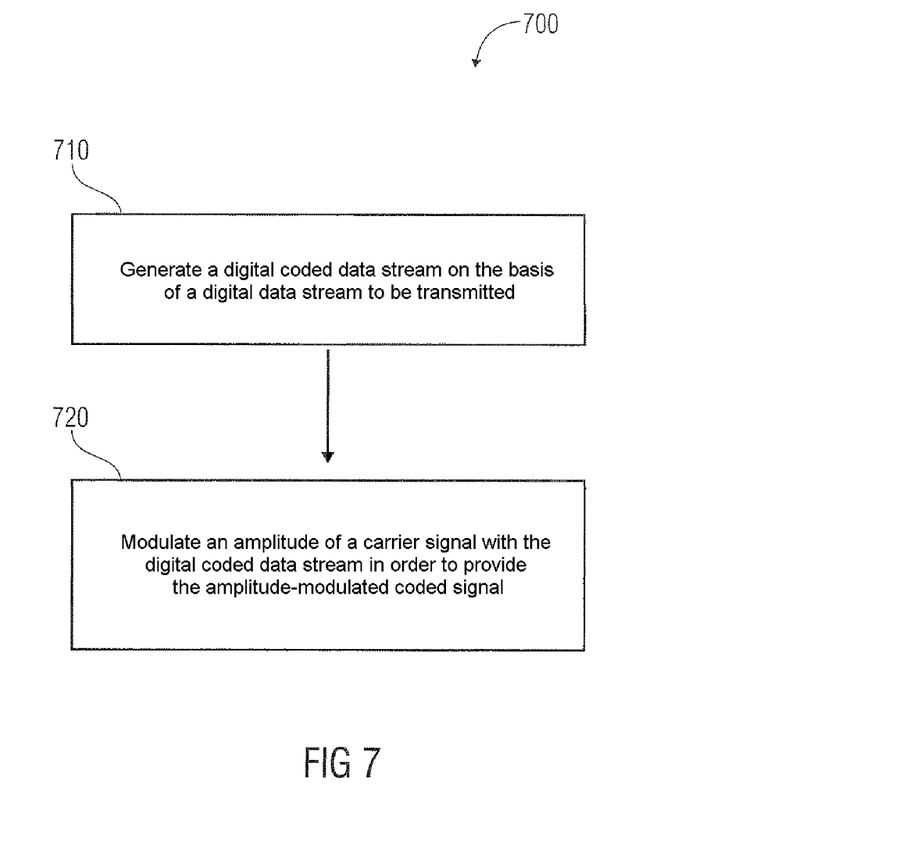
FIG. 7 shows a flowchart of a method for providing an amplitude-modulated coded signal.

FIG. 7 shows a flowchart of a method 700 for providing an amplitude-modulated coded signal in accordance with an exemplary embodiment. The method 700 includes generating a digital coded data stream based on a digital data stream to be transmitted (Step 710). In this case, the digital coded data stream has an initialization bit sequence. The initialization bit sequence has a maximum data frequency of the digital coded data stream. Furthermore, the digital coded data stream changes its value at the latest after a predefined number of bits. Furthermore, the method 700 includes modulating an amplitude of a carrier signal with the digital coded data stream in order to provide the amplitude-modulated coded signal (Step 720).

The method 700 may optionally also include further steps which were previously described in connection with the RFID transponder described above.

Figure 8:
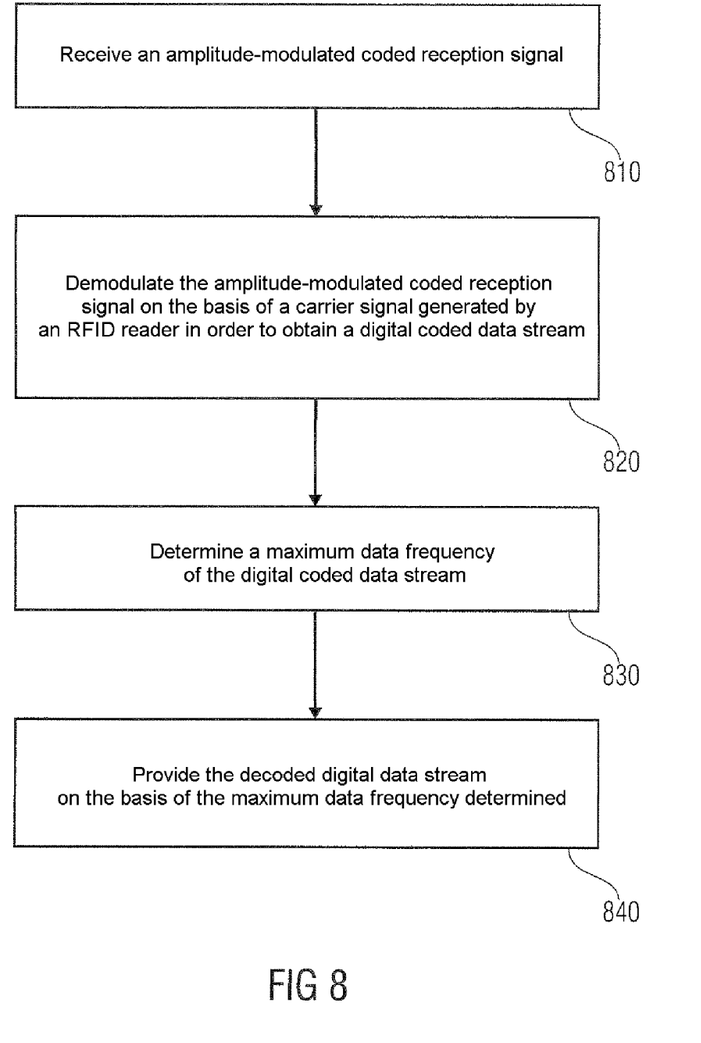
FIG. 8 shows a flowchart of a method for providing a decoded digital data stream.

FIG. 8 shows a flowchart of a method 800 for providing a decoded digital data stream in accordance with an exemplary embodiment. The method 800 includes receiving an amplitude-modulated coded reception signal (Step 810) and demodulating the amplitude-modulated coded reception signal based on a carrier signal generated by an RFID reader in order to obtain a digital coded data stream (Step 820). Furthermore, the method 800 includes determining a maximum data frequency of the digital coded data stream (Step 830) and providing a decoded digital data stream based on the maximum data frequency determined (Step 840).

The method 800 may optionally include further steps which were previously described in connection with the RFID reader described above.

Some exemplary embodiments relate to a coding method for a very high data rate (VHDR) in contactless applications e.g. for coding and/or modulation technique for data communication between a PICC (proximity integrated circuit card) and a PCD (proximity coupling device) for the high data rates. The transmission of data from a PICC (passive RFID transponder) to a PCD (RFID reader) is also referred to as an uplink. For example, data rates of more than 848 kilobits per second are referred to as very high data rates (VHDR). The coding and/or modulation scheme can increase the data rate. For example, contactless applications such as electronic passports or near field communication (NFC) need high communication rates.

The embodiments described herein provide an effective method for achieving very high data rates for the uplink. One advantage over M-PSK modulation (multi-phase shift keying modulation), for example, is a lower requirement for higher clock rate resolution imposed on the PICC (RFID transponder). Instead of two-stage load modulation, the uplink (transmission of data from the RFID transponder to the RFID reader) can be effected by simple load modulation (ASK, amplitude modulation) of the carrier signal. That is to say, there is no need to use a subcarrier signal, and the carrier signal can be modulated directly with the baseband data (the digital coded data stream). In this case, the baseband data may be subjected to NRZ coding, for example. If the NRZ-coded data stream has a data rate of 13.56 megabits per second, for example, the uplink may also have this value. In this case, an individual bit corresponds to a carrier signal period of $1/f_c$=73.75 ns. For the described example, Manchester coding is not an alternative to NRZ coding since Manchester coding uses a subcarrier signal which could limit the data rate and the associated maximum data frequency.

The coding and/or modulation embodiments described herein eliminate the need for a high phase resolution (that is to say a high clock rate) for the PICC (passive RFID transponder). Furthermore, the architecture of the digital part of the PICC can be kept simple since there is no need to generate multiphase modulation signals, for example. The architecture of the analog front end (for example the modulator) of the PICC can also be kept simple (adaptation to a higher load modulation frequency). Furthermore, the reception path of the PCD (RFID reader) does not require a complex demodulation and decoding unit (demodulator and decoder) in order to process the received modulated signal (for example reduced complexity in comparison with multiphase modulation demodulators).

As such, the embodiments described herein increase the data rate of the uplink (data transmission from the passive RFID transponder to the RFID reader). The coding methods described herein can increase the data rate for the uplink, for example by avoiding (the aid of) subcarrier signals. These embodiments achieve data rates up to the frequency of the carrier signal, for example 13.56 megabits per second, which makes it possible to multiply the communication speed (for example 16 times) of known concepts.

In this case, the embodiments described herein provide direct carrier signal modulation, the use of an initialization bit sequence also referred to herein as a start-up sequence (run-in pattern) having at least the highest possible data rate (frequency), and the use of a symbol (byte, word, double word framing) in order to avoid long sequences of 0s or 1s. An appropriate synchronization sequence (initialization bit sequence) is, for example, an alternating 10 bit pattern with the highest possible bit rate.

A high data throughput for the uplink requires, for example, a high data rate and compact and efficient data framing. More than one byte can be combined to form a character for this purpose, for example. The number of bytes per character and the bit/byte arrangement can be defined differently. As already mentioned above, FIG. 4a shows a possible character format with a start indication and a stop indication (character start sequence and character stop sequence). The start and stop indications may be a simple bit sequence (one or more bits) or a parity bit which is calculated over the entire character. No changes in a word representation (16 bits) or a double word representation (32 bits) cause long phases without a change in the load modulation (as shown in FIGS. 4c and 4d, for example). A method for avoiding long sequences without a change in the load modulation is, for example, the use of bit stuffing, scrambling or line codes, for example 4B5B. This code maps groups of 4 bits to groups of 5 bits. The 5-bit words may be predefined in a code table and may be selected to ensure that at least one transition takes place per word. The 4B5B code has a certain redundancy, with the result that a plurality of 4B5B characters can be used for control information or synchronization information, for example a start/stop flag. FIGS. 4e and 4f show an example of a 4B5B-coded double word. In comparison with FIGS. 4c and 4d, the coding rule avoids long phases without a change in the load modulation.

FIG. 4b shows a possible frame format which can be used for transmission from the PICC (passive RFID transponder) to the PCD (RFID reader). The frame includes a particular number of characters. For example, the maximum frame size can be defined as 128, 256, 512, 1024 bytes or a lower or higher number of bytes. For a high data throughput, a size of 256 bytes, for example, may be too small, with the result that frame sizes of more than 256 bytes may be expedient. The limits of each communication frame may be defined, for example, by a start/stop sequence, for example a 4B5B character which is not being used.

Although some aspects have been described in connection with an apparatus, these aspects also constitute a description of the corresponding method, with the result that a block or a component of an apparatus can also be understood as a corresponding method step or as a feature of a method step. In an analogous manner, aspects which have been described in connection with a method step or as a method step also constitute a description of a corresponding block or detail or feature of a corresponding apparatus.

Depending on particular implementation requirements, exemplary embodiments of the invention may be implemented using hardware or software. Implementation may be effected using a digital storage medium, for example a floppy disk, a DVD, a Blu-ray disk, a CD, a ROM, a PROM, an EPROM, an EEPROM or a flash memory, a hard disk or another magnetic or optical memory which stores electronically readable control signals which interact or can interact with a programmable computer system in such a manner that the respective method is carried out. The digital storage medium can therefore be computer-readable. Some exemplary embodiments thus include a data storage medium having electronically readable control signals which are able to interact with a programmable computer system in such a manner that one of the methods described herein is carried out.

Exemplary embodiments can generally be implemented as a computer program product with a program code, the program code carrying out one of the methods if the computer program product runs on a computer. The program code may also be stored, for example, on a machine-readable medium.

Other exemplary embodiments include the computer program for carrying out one of the methods described herein, the computer program being stored on a machine-readable medium.

In other words, one exemplary embodiment is thus a computer program having a program code for carrying out one of the methods described herein if the computer program runs on a computer. Another exemplary embodiment of the methods according to the invention is thus a data storage medium (or a digital storage medium or a computer-readable medium)

on which the computer program for carrying out one of the methods described herein is recorded.

Another exemplary embodiment is thus a data stream or a sequence of signals representing the computer program for carrying out one of the methods described herein. The data stream or the sequence of signals may be configured, for example, to be transferred via a data communication link, for example via the Internet.

Another exemplary embodiment includes a processing device, for example a computer or a programmable logic component, which is configured or operable to carry out one of the methods described herein.

Another exemplary embodiment includes a computer on which the computer program for carrying out one of the methods described herein is installed.

In some exemplary embodiments, a programmable logic component (for example a field-programmable gate array, FPGA) can be used to carry out some or all of the functionalities of the methods described herein. In some exemplary embodiments, a field-programmable gate array may interact with a microprocessor in order to carry out one of the methods described herein. In some exemplary embodiments, the methods are generally carried out by any desired hardware apparatus. The latter may be universally usable hardware, such as a computer processor (CPU), or hardware specific to the method, for example an ASIC.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A passive RFID transponder comprising:
   a coder configured to generate a digital coded data stream based on a digital data stream to be transmitted, the digital coded data stream including an initialization bit sequence having a maximum data frequency of the digital coded data stream, and to add at least one complementary bit to the digital data stream to be transmitted if the digital data stream to be transmitted does not change its value over more bits than a predefined number of bits; and
   a modulator configured to modulate an amplitude of a carrier signal with the digital coded data stream to provide an amplitude-modulated coded signal.

2. The passive RFID transponder as claimed in claim 1, wherein the maximum data frequency is independent of a subcarrier signal.

3. The passive RFID transponder as claimed in claim 1, wherein the coder is configured to generate the digital coded data stream based on NRZ coding.

4. The passive RFID transponder as claimed in claim 1, wherein the modulator comprises a transistor configured to be controlled at a control electrode by the digital coded data stream in order to modulate the carrier signal directly with the digital coded data stream.

5. A chip card including the passive RFID transponder as claimed in claim 1.

6. An RFID reader comprising:
   a receiver configured to receive an amplitude-modulated coded reception signal;
   a demodulator configured to demodulate the amplitude-modulated coded reception signal based on a carrier signal generated by the RFID reader to obtain a digital coded data stream; and
   a decoder configured to determine a maximum data frequency of the digital coded data stream, to provide a decoded digital data stream based on the maximum data frequency and to process digital coded data streams with different maximum data frequencies in order to generate decoded digital data streams.

7. The RFID reader as claimed in claim 6, wherein the digital coded data stream includes an initialization bit sequence having the maximum data frequency of the digital coded data stream.

8. The RFID reader as claimed in claim 6, further comprising a synchronization apparatus configured to compensate for a phase shift in the digital coded data stream based on a change in the value of the digital coded data stream.

9. The RFID reader as claimed in claim 6, wherein the digital coded data stream changes its value at the latest after a predefined number of bits.

10. The RFID reader as claimed in claim 6, wherein the demodulator comprises a differential amplifier configured to amplify a difference between the amplitude-modulated coded reception signal and the carrier signal generated by the RFID reader, and wherein the demodulator is configured to obtain the digital coded data stream based on the amplified difference.

11. A method of providing an amplitude-modulated coded signal, comprising:
    generating a digital coded data stream based on a digital data stream to be transmitted, the digital coded data stream including an initialization bit sequence having a maximum data frequency of the digital coded data stream;
    adding at least one complementary bit to the digital data stream to be transmitted if the digital data stream to be transmitted does not change its value over more bits than a predefined number of bits; and
    modulating an amplitude of a carrier signal with the digital coded data stream to provide the amplitude-modulated coded signal.

12. The method of claim 11 wherein the maximum data frequency is independent of a subcarrier signal.

13. A passive RFID transponder comprising:
    a coder configured to generate a digital coded data stream based on a digital data stream to be transmitted, the digital coded data stream including an initialization bit sequence having a maximum data frequency of the digital coded data stream, and to assign a group of data bits with a defined number of data bits from the digital data stream to be transmitted to a coded bit sequence in order to obtain the digital coded data stream, a number of bits in the coded bit sequence being greater than the defined number of data bits, and not all bits in the coded bit sequence having the same value; and a modulator configured to modulate an amplitude of a carrier signal with the digital coded data stream to provide an amplitude-modulated coded signal.

14. The passive RFID transponder as claimed in claim 13, wherein the maximum data frequency is independent of a subcarrier signal.

15. A chip card including the passive RFID transponder as claimed in claim 13.

16. The passive RFID transponder as claimed in claim 13, wherein the coder is configured to generate the digital coded data stream based on NRZ coding.

17. The passive RFID transponder as claimed in claim 13, wherein the modulator comprises a transistor configured to be controlled at a control electrode by the digital coded data stream in order to modulate the carrier signal directly with the digital coded data stream.

18. A method of providing an amplitude-modulated coded signal, comprising:

generating a digital coded data stream based on a digital data stream to be transmitted, the digital coded data stream including an initialization bit sequence having a maximum data frequency of the digital coded data stream, assigning a group of data bits with a defined number of data bits from the digital data stream to be transmitted to a coded bit sequence in order to obtain the digital coded data stream, a number of bits in the coded bit sequence being greater than the defined number of data bits, and not all bits in the coded bit sequence having the same value; and modulating an amplitude of a carrier signal with the digital coded data stream to provide the amplitude-modulated coded signal.

19. The method of claim 18, wherein the wherein the maximum data frequency is independent of a subcarrier signal.

* * * * *